US012649255B2

(12) United States Patent
Viola et al.

(10) Patent No.: US 12,649,255 B2
(45) Date of Patent: Jun. 9, 2026

(54) TENSIONING DEVICES FOR MAINTAINING TENSION IN CHAIN SAWS

(71) Applicant: Chain Orthopedics, LLC, Bogota, NJ (US)

(72) Inventors: Paul Viola, Bogota, NJ (US); Richard Thomas Briganti, Bala Cynwyd, PA (US)

(73) Assignee: Chain Orthopedics, LLC, Bogota, NJ (US)

( * ) Notice: Subject to any disclaimer, the term of this patent is extended or adjusted under 35 U.S.C. 154(b) by 620 days.

(21) Appl. No.: 17/741,734

(22) Filed: May 11, 2022

(65) Prior Publication Data

US 2022/0395999 A1 Dec. 15, 2022

Related U.S. Application Data

(60) Provisional application No. 63/305,422, filed on Feb. 1, 2022, provisional application No. 63/209,525, filed on Jun. 11, 2021.

(51) Int. Cl.
*B27B 17/14* (2006.01)
*B27B 17/02* (2006.01)

(52) U.S. Cl.
CPC .............. *B27B 17/14* (2013.01); *B27B 17/02* (2013.01)

(58) Field of Classification Search
CPC ................................ B27B 17/14; B27B 17/02
(Continued)

(56) References Cited

U.S. PATENT DOCUMENTS 614,003 A 11/1898 Johnson
1,016,664 A * 2/1912 Bailey .................... B27B 17/14 30/384

(Continued)

FOREIGN PATENT DOCUMENTS

CN 1827275 A 9/2006
CN 204450777 U 7/2015

(Continued)

OTHER PUBLICATIONS

Alessi, A., et al., "The Functionality of a Novel Robotic Surgical Assistant for Total Knee Arthroplasty: A Case Series," Case Reports in Orthopedics, vol. 2021, Article ID 6659707, 18 pages (Mar. 17, 2021).

(Continued)

*Primary Examiner* — Nhat Chieu Q Do
(74) *Attorney, Agent, or Firm* — Potomac Law Group, PLLC; Douglas E. Ringel

(57) ABSTRACT

Tensioning devices for maintaining tension in a chain of a chain saw are disclosed. An example tensioning device includes a housing adapted to be coupled to a drive cog of a chain saw, a saw bar mount adapted to be coupled to a saw bar of a chain saw, and at least one spring adapted to bias the saw bar mount in a distal direction from the housing, thereby tensioning the spring. The tensioning device may also include a ratchet and pawl assembly that allows the saw bar mount to be moved in the distal direction and stops movement of the saw bar mount in a proximal direction. The tensioning device may also include a lock adapted to hold the saw bar mount in a proximal position against a biasing force of the spring. Methods of assembling components for maintaining tension in a chain of a chain saw and of operating the assembled components are also disclosed.

15 Claims, 9 Drawing Sheets

(58) Field of Classification Search
USPC ........................................................ 30/386
See application file for complete search history.

(56) References Cited

U.S. PATENT DOCUMENTS

| | | | |
|---|---|---|---|
| 1,178,362 | A | 4/1916 | Wall |
| 2,007,806 | A | 7/1935 | Logan |
| 2,117,586 | A | 5/1938 | Willson |
| 2,308,847 | A | 1/1943 | Wolf |
| 2,380,753 | A | 7/1945 | Segerstad |
| 2,427,580 | A | 9/1947 | Stryker |
| 2,638,944 | A | 5/1953 | Woleslagle |
| 2,649,871 | A | 8/1953 | Desbaret |
| 3,910,147 | A | 10/1975 | Heyerdahl |
| 4,316,327 | A | 2/1982 | Scott et al. |
| 4,457,307 | A | 7/1984 | Stillwell |
| 4,492,140 | A | 1/1985 | Pano |
| 4,562,761 | A | 1/1986 | Alexander |
| 4,683,659 | A | 8/1987 | Wunsch et al. |
| 4,807,366 | A | 2/1989 | Masato et al. |
| 4,915,317 | A * | 4/1990 | Birch ...................... B26D 1/48 242/527.5 |
| 4,952,213 | A | 8/1990 | Bowman et al. |
| 5,209,216 | A | 5/1993 | Mogi |
| 5,226,404 | A | 7/1993 | Mogi et al. |
| 5,228,459 | A | 7/1993 | Caspari et al. |
| 5,345,686 | A | 9/1994 | Zimmermann |
| 5,725,530 | A | 3/1998 | Popken |
| 5,826,343 | A | 10/1998 | Mollberg, Jr. |
| 5,942,975 | A | 8/1999 | Sorensen |
| 5,954,144 | A | 9/1999 | Thames |
| 5,988,035 | A | 11/1999 | Rossmann |
| 6,178,960 | B1 | 1/2001 | Svensson |
| 6,564,459 | B1 | 5/2003 | Steinbrueck et al. |
| 6,694,623 | B1 | 2/2004 | Haughey |
| 6,782,627 | B2 | 8/2004 | Hermes et al. |
| 7,155,832 | B2 | 1/2007 | Warfel et al. |
| 7,743,513 | B1 | 6/2010 | Fisher et al. |
| 7,936,094 | B2 | 5/2011 | Rossi et al. |
| 8,316,547 | B2 | 11/2012 | Hecht et al. |
| 8,398,640 | B2 | 3/2013 | Hawkins et al. |
| 8,498,744 | B2 | 7/2013 | Odermatt et al. |
| 9,339,878 | B2 | 5/2016 | Fuchs |
| 9,367,062 | B2 | 6/2016 | Volpert |
| 9,457,489 | B2 | 10/2016 | Fuchs |
| 9,539,717 | B2 | 1/2017 | Fuchs |
| 9,579,783 | B2 | 2/2017 | Wirnitzer et al. |
| 9,610,698 | B2 | 4/2017 | Fuchs |
| 9,616,512 | B1 | 4/2017 | Viola |
| 9,701,037 | B2 * | 7/2017 | Zieger .................... B27B 17/02 |
| 9,707,677 | B2 | 7/2017 | Zieger et al. |
| 9,724,841 | B2 | 8/2017 | Engelfried et al. |
| 9,744,606 | B2 | 8/2017 | Engelfried et al. |
| 9,744,684 | B2 | 8/2017 | Fuchs |
| 9,744,686 | B2 | 8/2017 | Engelfried et al. |
| 9,789,625 | B2 | 10/2017 | Engelfried et al. |
| 9,789,627 | B2 | 10/2017 | Engelfried et al. |
| 9,844,824 | B2 | 12/2017 | Fuchs |
| 9,937,573 | B2 | 4/2018 | Haldar |
| 9,962,854 | B2 | 5/2018 | Hug et al. |
| 10,052,785 | B2 | 8/2018 | Fuchs et al. |
| 10,160,135 | B2 | 12/2018 | Bozic |
| 10,173,339 | B2 | 1/2019 | Fuchs et al. |
| 10,350,782 | B2 | 7/2019 | Engelfried et al. |
| 10,384,367 | B2 | 8/2019 | Engelfried et al. |
| 10,391,568 | B2 | 8/2019 | Fuchs |
| 10,406,714 | B2 | 9/2019 | Duerr et al. |
| 10,486,326 | B2 | 11/2019 | Fuchs |
| 10,500,656 | B2 | 12/2019 | Lutz et al. |
| 10,639,731 | B2 | 5/2020 | Engelfried et al. |
| 10,695,939 | B2 | 6/2020 | Fuchs et al. |
| 10,695,943 | B2 | 6/2020 | Kachi et al. |
| 11,192,271 | B2 | 12/2021 | Roden et al. |
| 12,172,254 | B2 | 12/2024 | Hagberg |
| 2003/0045883 | A1 | 3/2003 | Chow et al. |
| 2004/0181951 | A1 | 9/2004 | Wittke |
| 2005/0028375 | A1 | 2/2005 | Stones et al. |
| 2006/0009796 | A1 | 1/2006 | Carusillo et al. |
| 2006/0122616 | A1 | 6/2006 | Bennett et al. |
| 2006/0200161 | A1 | 9/2006 | Plaskos et al. |
| 2006/0229649 | A1 | 10/2006 | Levesque et al. |
| 2007/0123896 | A1 | 5/2007 | Wyss et al. |
| 2008/0033443 | A1 | 2/2008 | Sikora et al. |
| 2008/0140081 | A1 | 6/2008 | Heavener et al. |
| 2009/0248044 | A1 | 10/2009 | Amiot et al. |
| 2010/0194209 | A1 | 8/2010 | Richter |
| 2011/0005088 | A1 | 1/2011 | Pellenc |
| 2011/0208197 | A1 | 8/2011 | Carusillo et al. |
| 2011/0314682 | A1 | 12/2011 | Maag et al. |
| 2012/0279074 | A1 | 11/2012 | Ruth |
| 2013/0228058 | A1 | 9/2013 | Gruber et al. |
| 2014/0059868 | A1 | 3/2014 | Engelfried et al. |
| 2014/0060279 | A1 | 3/2014 | Fuchs |
| 2014/0083884 | A1 | 3/2014 | Everett |
| 2014/0106915 | A1 | 4/2014 | Kistler et al. |
| 2014/0123504 | A1 | 5/2014 | Fuchs |
| 2014/0123827 | A1 | 5/2014 | Fuchs et al. |
| 2014/0166323 | A1 | 6/2014 | Cooper |
| 2014/0193039 | A1 | 7/2014 | Wexler |
| 2015/0122102 | A1 | 5/2015 | Engelfried et al. |
| 2015/0321381 | A1 | 11/2015 | Engelfried et al. |
| 2016/0045964 | A1 | 2/2016 | Likidou |
| 2016/0052158 | A1 | 2/2016 | Luedtke |
| 2016/0279752 | A1 | 9/2016 | Zipf et al. |
| 2017/0320227 | A1 | 11/2017 | Engelfried et al. |
| 2018/0162007 | A1 | 6/2018 | Engelfried et al. |
| 2018/0339387 | A1 | 11/2018 | Kahle et al. |
| 2019/0223393 | A1 | 7/2019 | Blevens et al. |
| 2019/0388158 | A1 | 12/2019 | Mahfouz |
| 2020/0001493 | A1 | 1/2020 | Engelfried et al. |
| 2020/0038978 | A1 | 2/2020 | Fuchs |
| 2021/0094202 | A1 * | 4/2021 | Roden .................... B27B 17/02 |
| 2021/0235626 | A1 | 8/2021 | Gerstenberger et al. |
| 2021/0334995 | A1 | 10/2021 | Spence et al. |
| 2022/0032489 | A1 | 2/2022 | Viola et al. |
| 2022/0241920 | A1 | 8/2022 | Hagberg |
| 2022/0273315 | A1 | 9/2022 | Viola et al. |
| 2024/0173783 | A1 | 5/2024 | Blair et al. |

FOREIGN PATENT DOCUMENTS

| | | | |
|---|---|---|---|
| CN | 105050779 | A | 11/2015 |
| CN | 112336412 | A | 2/2021 |
| DE | 2611720 | A1 | 9/1977 |
| DE | 3811197 | A1 | 10/1989 |
| DE | 29622144 | U1 | 3/1997 |
| DE | 10227749 | A1 | 1/2004 |
| DE | 202017100467 | U1 | 2/2017 |
| EP | 2990170 | A1 | 3/2016 |
| EP | 2866987 | B1 | 4/2020 |
| EP | 2866988 | B1 | 5/2020 |
| ES | 1154011 | U | 4/2016 |
| GB | 2354481 | A | 3/2001 |
| KR | 2020200002598 | U | 12/2020 |
| WO | 2006061248 | A2 | 6/2006 |
| WO | 2014001066 | A1 | 1/2014 |
| WO | 2022026535 | A1 | 2/2022 |

OTHER PUBLICATIONS

Bosch Media Service, “Quick, easy and powerful sawing in house and garden: New ‘NanoBlade’ saw from Bosch for DIY enthusiasts,” Robert Bosch GmbH (https://www.bosch-presse.de/pressportal/de/en/18-volt-akku-saege-erweitert-das-programm-148813.html), 7 pages (2018).

Bosch Stories, “Small chain, big impact; NanoBlade: a technology which revolutionizes sawing,” Robert Bosch GmbH (https://www.bosch.com/stories/nanoblade-small-chain-big-impact/), 10 pages (undated).

BuildingPoint Central, “Why Use 3D Laser Scanning in Home Building and Renovations, ” https://buildingpointcentral.com/why-

(56) References Cited

OTHER PUBLICATIONS use-3d-laser-scanning-in-home-building-and-renovations/, 11 pages (Sep. 13, 2021).
Cobot Nation, "Cobot Nation Partners with Cognex to Utilize Machine Vision with Collaborative Robots," 3 pages (Aug. 18, 2021).
Halanski, M.A., "How to Avoid Cast Saw Complications," Journal of Pediatric Orthopaedics, 36:S1-S5 (2016).
Intellijoint Surgical, "Intellijoint Surgical Launches New Smart Navigation Solution for Total Knee Replacements—Intellijoint Knee," 5 pages (Mar. 3, 2020).
International Search Report and Written Opinion for International Application No. PCT/US2021/043433 dated Dec. 13, 2021.
International Search Report and Written Opinion for International Application No. PCT/US2022/014679, dated Jul. 1, 2022.
International Search Report and Written Opinion for International Application No. PCT/US2022/028792, Dated Aug. 12, 2022.
Mako Tka Surgical Guide, PN 210469 Rev 00, 64 pages (2016).
Newmarker, C., "CORI Handheld Robotics System Launches with Smith+Nephew Real Intelligence Line," https://www.therobotreport.com/cori-handheld-robotics-system-launched-smithandnephew/, 5 pages (Jul. 14, 2020).
Parratte, S., et al., "Accuracy of a New Robotically Assisted Technique for Total Knee Arthroplasty: A Cadaveric Study," J Arthroplasty, 34 (11), pp. 2799-2803 (2019).
Schwarzkopf, R., "The use of imageless navigation to quantify cutting error in total knee arthroplasty," Knee Surgery & Related Research 33:43, 9 pages (2021).
Stryker Surgical, "The Stryker Precision Oscillating Tip Saw," product brochure, 2 pages (2006).
Weytoll, "Weytoll 4 Inch Electric Drill Modified to Electric Chainsaw Tool Attachment Electric Chainsaws Accessory Practical Modification Tool Set Woodworking Cutting Tool," listing from amazon.com, 14 pages (available from May 30, 2022).
Zimmer Biomet, "ROSA Knee System Surgical Technique V 1.1," 60 pages (2020).

* cited by examiner

TENSIONING DEVICES FOR MAINTAINING TENSION IN CHAIN SAWS

CROSS-REFERENCE TO RELATED APPLICATIONS

This application claims priority to U.S. Provisional Patent Application No. 63/209,525, filed Jun. 11, 2021, entitled "Devices for Maintaining Tension in Chain Saws," and U.S. Provisional Patent Application No. 63/305,422, filed Feb. 1, 2022, entitled "Devices for Maintaining Tension in Chain Saws." The entire contents of these applications are incorporated herein by reference.

This application is also related to U.S. Provisional Patent Application No. 63/058,216, filed Jul. 29, 2020, entitled "Thin Single Width Chain Saw," U.S. Provisional Patent Application No. 63/085,290, filed Sep. 30, 2020, entitled "Thin Single Width Chain Saw," U.S. Provisional Patent Application No. 63/147,033, filed Feb. 8, 2021, entitled "Chain Saws and Components for Chain Saws," U.S. Provisional Patent Application No. 63/154,367, filed Feb. 26, 2021, entitled "Cutting Guide Systems," U.S. Provisional Patent Application No. 63/154,379, filed Feb. 26, 2021, entitled "Systems and Methods for Manufacturing Saws and Saw Components," U.S. Provisional Patent Application No. 63/195,994, filed Jun. 2, 2021, entitled "Cutting Guide Systems and Methods," U.S. Provisional Patent Application No. 63/209,540, filed Jun. 11, 2021, entitled "Systems for Robotic Surgery," U.S. Non-Provisional patent application Ser. No. 17/443,646, filed Jul. 27, 2021, now U.S. Pat. No. 12,109,724, entitled "Chain Saws, Components for Chain Saws, and Systems for Operating Saws," International Application No. PCT/US2021/043433, filed Jul. 28, 2021, entitled "Chain Saws, Components for Chain Saws, and Systems for Operating Saws," U.S. Provisional Patent Application No. 63/272,332, filed Oct. 27, 2021, entitled "Systems and Methods for Preparing Construction Layouts Using Imaging and Computerized Mapping," U.S. Provisional Patent Application No. 63/305,469, filed Feb. 1, 2022, entitled "Knives and Other Tools and Devices Incorporating Cutting Chains," U.S. Non-Provisional patent application Ser. No. 17/590,192, filed Feb. 1, 2022, now U.S. Pat. No. 12,193,684, entitled "Cutting Guide Systems and Methods," and International Application No. PCT/US2022/014679, filed Feb. 1, 2022, entitled "Cutting Guide Systems and Methods." The entire contents of these applications are incorporated herein by reference.

TECHNICAL FIELD

The present disclosure is directed to devices for maintaining tension in the chains of chain saws, and related methods.

BACKGROUND

Many people suffer from orthopedic conditions in which the cutting of bone or other tissue is required or useful. As an example, many people suffer from serious joint problems that require surgical procedures to implant artificial joints. Every year physicians implant millions of artificial joints in procedures that require the patient's bone to be modified to accept the implant. The most common joint procedure is knee replacement. The modification of bone in knee replacements involves making a series of flat cuts at the ends of the two main adjacent long bones that will be joined by the implant. Ideally these cuts are made precisely complementary to the shape of the implant. A flat surface of healthy bone opposed to the analogous surface of the implant results in the strongest healing of the connection, with less chance of complications or implant failure.

Sawing bone or other tissue during surgical procedures has requirements beyond those in other sawing applications. Specifically, in surgical procedures, the saw must be sterile, the saw bar needs to be easy to control by the surgeon, and vibration and loud sounds need to be minimized. In addition, the saw must perform the cutting in a way that does not generate excessive heat, the procedure must not deposit metal particles or other contaminants in the surgical field, and the procedure must result in cutting hard bone or other tissue while minimizing injury to adjacent soft tissue, among other considerations.

The cuts made by a bone saw are ideally flat in the plane of the bar and straight at the cut borders. This is needed to allow optimal healing when two bone surfaces are opposed, or one bone surface is opposed to an implant surface. Surfaces that are not in the same plane, or uneven surfaces, form empty gaps which may take a long time to heal or may never heal. Some saws tend to experience drifting away from the intended plane of the saw bar, called skiving, which is undesirable. Also, some saws have cutting elements that tend to experience a grabbing action that results in unguided movement of the bar, which is also undesirable.

In a surgical procedure, a bone saw is controlled by a surgeon in an operating room environment. Preferably the saw produces minimal vibration so that it can be easily controlled by the surgeon. This is important for multiple reasons. Bones are typically next to important and delicate soft tissue such as blood vessels and nerves, and uncontrolled movement can result in damage to such tissue. Also, uncontrolled movement can result in less desirable cuts.

Chain saws have long been used in applications such as wood cutting; however, until now they have not been successfully deployed for common surgical use. This is due to many technical challenges of the chain saw for the specific requirements of bone or other surgery. U.S. Pat. No. 9,616,512 to Viola discloses a chain saw for cutting bone. The disclosure of U.S. Pat. No. 9,616,512 is hereby incorporated by reference herein in its entirety. U.S. Provisional Patent Application No. 63/058,216, filed Jul. 29, 2020, entitled "Thin Single Width Chain Saw," U.S. Provisional Patent Application No. 63/085,290, filed Sep. 30, 2020, entitled "Thin Single Width Chain Saw," U.S. Provisional Patent Application No. 63/147,033, filed Feb. 8, 2021, entitled "Chain Saws and Components for Chain Saws," U.S. Provisional Patent Application No. 63/154,367, filed Feb. 26, 2021, entitled "Cutting Guide Systems," U.S. Provisional Patent Application No. 63/154,379, filed Feb. 26, 2021, entitled "Systems and Methods for Manufacturing Saws and Saw Components," U.S. Provisional Patent Application No. 63/195,994, filed Jun. 2, 2021, entitled "Cutting Guide Systems and Methods," U.S. Provisional Patent Application No. 63/209,540, filed Jun. 11, 2021, entitled "Systems for Robotic Surgery," U.S. Non-Provisional patent application Ser. No. 17/443,646, filed Jul. 27, 2021, entitled "Chain Saws, Components for Chain Saws, and Systems for Operating Saws," and International Application No. PCT/US2021/043433, filed Jul. 28, 2021, entitled "Chain Saws, Components for Chain Saws, and Systems for Operating Saws," the disclosures of which are incorporated by reference herein in their entirety, disclose chain saws, components for chain saws, cutting guide systems for chain saws, methods of making chain saws and components, and methods of using chain saws and components.

SUMMARY

The present disclosure is directed to devices for maintaining tension in the chains of chain saws, and related methods. Certain embodiments of devices for maintaining tension in chain saws disclosed herein may be used in orthopedic surgery, such as orthopedic knee surgery, spinal surgery, or other orthopedic surgery.

In some examples, a tensioning device for maintaining tension in a chain of a chain saw comprises a housing adapted to be coupled to a drive cog of a chain saw, a saw bar mount adapted to be coupled to a saw bar of a chain saw, and at least one spring adapted to bias the saw bar mount in a distal direction from the housing.

In some examples, the saw bar mount may comprise at least one post, and the housing may comprise at least one channel adapted to receive the at least one post of the saw bar mount. The tensioning device may further comprise a cap at a proximal end of the at least one post, wherein the cap prevents the at least one post from sliding too far in the distal direction when the saw bar mount is assembled with the housing. The cap may be removable from the at least one post.

In some examples, the housing may comprise at least one post, and the saw bar mount may comprise at least one channel adapted to receive the at least one post of the housing.

In some examples, the tensioning device further comprises a ratchet and pawl assembly, wherein the ratchet and pawl assembly allows the saw bar mount to be moved in the distal direction and stops movement of the saw bar mount in a proximal direction. The ratchet and pawl assembly may comprise at least one ratchet with a series of teeth and at least one pawl for engaging the teeth of the at least one ratchet. The at least one ratchet may be a component of or connected to the saw bar mount, and the at least one pawl may be a component of or connected to the housing. Alternatively, the at least one ratchet may be a component of or connected to the housing, and the at least one pawl may be a component of or connected to the saw bar mount.

The tensioning device may further comprise a lock, wherein the lock is adapted to hold the saw bar mount in a proximal position against a biasing force of the spring. The lock can facilitate loading of the chain saw or loading of the chain around the saw bar and drive cog. After the drive cog of the chain saw has been coupled to the housing and after the saw bar of the chain saw has been coupled to the saw bar mount, with a chain located around the saw bar and the drive cog, the lock may be released.

In some examples, a method of assembling a tensioning device for maintaining tension in a chain of a chain saw comprises assembling a saw bar mount to a housing, including moving the saw bar mount in a proximal direction with respect to the housing, coupling a drive cog of the chain saw to the housing, and coupling a saw bar of the chain saw to the saw bar mount, wherein the tensioning device comprises at least one spring adapted to bias the saw bar mount in a distal direction from the housing.

In some examples, the step of assembling the saw bar mount to the housing may be performed before coupling the drive cog of the chain saw to the housing and may be performed before coupling the saw bar of the chain saw to the saw bar mount. The steps of coupling the drive cog of the chain saw to the housing and coupling the saw bar of the chain saw to the saw bar mount may be performed by coupling a cartridge to the assembly of the saw bar mount and the housing, wherein the cartridge includes the saw bar, the drive cog, and a chain around the saw bar and the drive cog. Alternatively, the method may comprise placing a chain around the saw bar and the drive cog after coupling the drive cog of the chain saw to the housing and after coupling the saw bar of the chain saw to the saw bar mount.

In some examples, the step of assembling the saw bar mount to the housing may be performed after coupling the drive cog of the chain saw to the housing and after coupling the saw bar of the chain saw to the saw bar mount. The method may further comprise the step of placing a chain around the saw bar and the drive cog after assembling the saw bar mount to the housing.

The method of assembling the tensioning device may further comprise using a lock to hold the saw bar mount in a proximal position against a biasing force of the spring. The method may further comprise releasing the lock after the drive cog of the chain saw has been coupled to the housing and after the saw bar of the chain saw has been coupled to the saw bar mount, wherein a chain is located around the saw bar and the drive cog at the time of releasing the lock.

In some examples, a method of assembling and operating a tensioning device for maintaining tension in a chain of a chain saw comprises assembling a saw bar mount to a housing, including moving the saw bar mount in a proximal direction with respect to the housing, coupling a drive cog of the chain saw to the housing, and coupling a saw bar of the chain saw to the saw bar mount, wherein the tensioning device comprises at least one spring adapted to bias the saw bar mount in a distal direction away from the housing, and wherein during use of the chain saw the at least one spring provides a distally-directed force on the saw bar mount that keeps a chain of the chain saw engaged with the drive cog and with the saw bar and maintains tension in the chain. The method may further comprise, during use of the chain saw, allowing the saw bar mount to be moved by the spring in the distal direction and stopping movement of the saw bar mount in a proximal direction. Stopping movement of the saw bar mount in the proximal direction may be accomplished by a ratchet and pawl assembly.

Further examples and features of embodiments of the invention will be evident from the drawings and detailed description.

BRIEF DESCRIPTION OF THE DRAWINGS

The accompanying drawings illustrate examples of devices, components, and methods disclosed herein and, together with the description, serve to explain the principles of the present disclosure.

DETAILED DESCRIPTION

Figure 1:
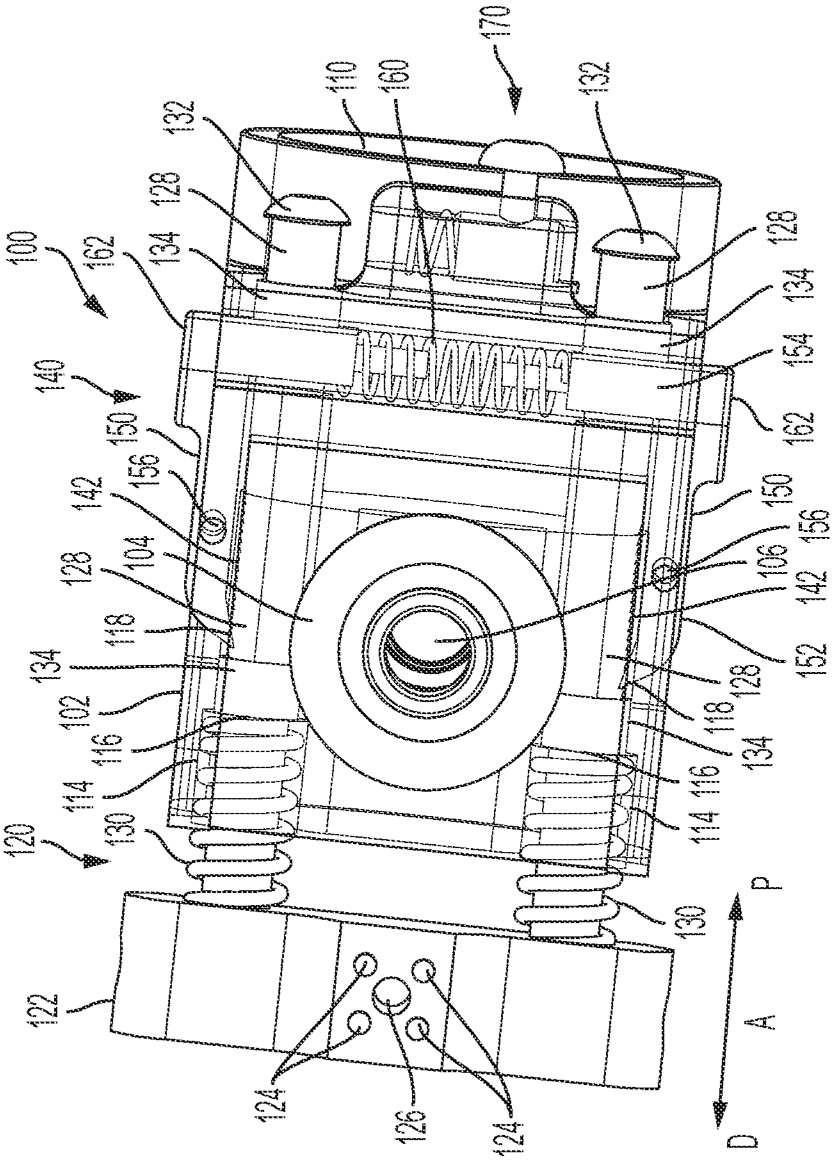
FIG. 1 shows a first example of a tensioning device for maintaining tension in the chain of a chain saw.

For the purposes of promoting an understanding of the principles of the disclosure, reference will now be made to the examples illustrated in the drawings, and specific language will be used to describe those and other examples. It will nevertheless be understood that no limitation of the scope of the claims is intended by the examples shown in the drawings or described herein. Any alterations and further modifications to the illustrated or described systems, devices, components, or methods, and any further application of the principles of the present disclosure, are fully contemplated as would normally occur to one skilled in the art to which the disclosure relates. In particular, the features, components, and/or steps described with respect to one implementation of the disclosure may be combined with features, components, and/or steps described with respect to other implementations of the disclosure.

The designations "first" and "second" as used herein are not meant to indicate or imply any particular positioning or other characteristic. Rather, when the designations "first" and "second" are used herein, they are used only to distinguish one component or part from another. The terms "attached," "connected," "coupled," and the like mean attachment, connection, coupling, etc., of one part to another either directly or indirectly through one or more other parts, unless direct or indirect attachment, connection, coupling, etc., is specified. The term "user" refers to one or more persons using the devices, systems, and/or methods described herein, such as one or more surgeons, physicians, operators, or other persons using the devices, systems, and/or methods.

U.S. Pat. No. 9,616,512, U.S. Provisional Patent Application No. 63/147,033, U.S. Non-Provisional patent application Ser. No. 17/443,646, and International Application No. PCT/US2021/043433 describe and illustrate examples of types of chain saws that may be used with devices as disclosed herein.

It is desirable that the chain of a chain saw be appropriately tensioned, so that it is not loose around the chain saw bar, which can create problems with the operation of the chain saw and with the resultant cutting. It is desirable that the chain be put under proper tension for initial use of the chain saw. In addition, it is desirable that a proper tension on the chain be maintained during operation of the chain saw. During operation of the chain saw, a chain can become loosened due to various factors, such as wear on the links of the chain, wear on the bar, wear on the drive cog, stretching of the chain, vibrations, etc. Devices as disclosed herein are useful for putting a chain under a desired tension for initial use and/or for maintaining a desired tension in the chain during operation of the chain saw.

Figure 9A:
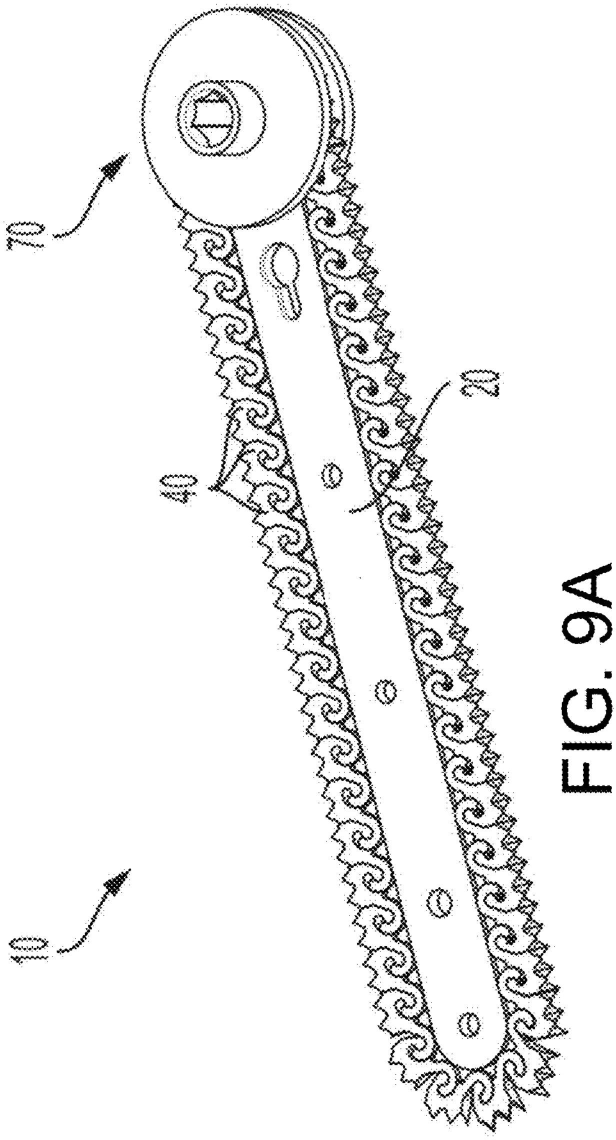
FIG. 9A shows an example of a chain saw cartridge.
Figure 9B:
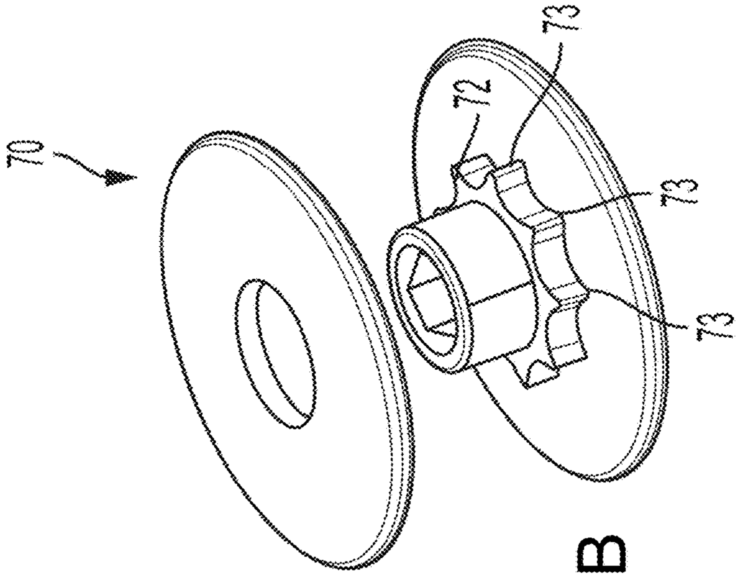
FIG. 9B shows the drive cog assembly of the chain saw cartridge of FIG. 9A, in an exploded view.

An example chain saw, as shown in FIGS. 9A and 9B, includes a saw bar 20, a chain comprising a series of links 40, and a drive cog 72. The chain extends around the saw bar 20 and the drive cog 72. To mount the chain on the saw bar 20, the links 40 may be coupled to each other. The chain can be placed around the saw bar 20 and around the drive cog 72. The drive cog 72 has a series of drive cog teeth 73 around the perimeter of the drive cog 72. In operation, the drive cog 72 is driven by a driving mechanism. Rotation of the drive cog 72 causes the chain to move around the saw bar 20.

FIGS. 1-8 show a first example embodiment of a tensioning device 100 for maintaining tension in the chain of a chain saw. This example tensioning device 100 includes a housing 102, which is illustrated as transparent in FIGS. 1 and 2 in order to show internal features of the housing 102 and components within the housing 102.

The tensioning device 100 further comprises a saw bar mount 120 comprising a saw bar holder 122 to which the proximal end of a saw bar of a chain saw may be mounted. In other words, the saw bar mount 120 is adapted to be coupled to a saw bar of a chain saw. The saw bar holder 122 may have one or more structures for facilitating aligning the saw bar with respect to the saw bar holder 122 and for facilitating fastening the proximal end of the saw bar to the saw bar holder 122. For example, the saw bar holder 122 may have one or more pins 124 (e.g., machined integral studs) that fit into corresponding holes or recesses in the proximal end of the saw bar, and a hole 126 through or into which a fastener may be placed for connecting the proximal end of the saw bar to the saw bar holder 122. In some embodiments, the hole 126 may be threaded to serve as a fastener for connecting the saw bar to the saw bar holder 122.

The saw bar mount 120 further includes one or more posts 128. The posts 128 are attached to or integral with the saw bar holder 122 and act as guides for the saw bar holder 122 with respect to the housing 102. In the illustrated example, there are two posts 128, although in other embodiments fewer posts (one post) or more posts (three or more posts) may be used. The posts 128 may be, for example, cylinders that are one quarter inch in diameter. Other shapes and sizes are possible for the posts 128. For example, the posts 128 may have a cross-section that is circular, square, rectangular, oval, triangular, or any other suitable shape.

The housing 102 has channels 118 for receiving the posts 128 such that the posts 128 can slide back and forth within the housing 102. This allows the saw bar mount 120 to move back and forth linearly with respect to the housing 102 in the direction indicated by arrow A. The side of the arrow A labeled D indicates the distal direction (toward the bone or other material being cut), while the side of the arrow A labeled P indicates the proximal direction (toward the user or away from the bone or other material being cut). In an alternate embodiment, the housing 102 may have one or more posts projecting toward the saw bar mount 120, and the saw bar mount 120 may have one or more channels for receiving the one or more posts of the housing 102. In such an embodiment, the saw bar mount 102 can slide back and forth on the posts of the housing 102. This allows the saw bar mount 120 to move back and forth linearly with respect to the housing 102 in the direction indicated by arrow A.

One or more springs 130 are used to bias the saw bar mount 120 away from the housing 102 in the distal direction D. In the illustrated example, a spring 130 is around each post 128, with one end against the saw bar holder 122 and one end against the housing 102. Each spring 130 is recessed in a counterbore 114 with a surface 116 against which the spring 130 is mounted. Other embodiments are possible. For example, the springs 130 need not be mounted around the posts 128. In addition, the springs 130 may abut other surfaces that are part of or are connected to the saw bar mount 120 and housing 102 to bias the saw bar mount 120 away from the housing 102 in the distal direction D. In an alternate embodiment in which the housing 102 has one or more posts and the saw bar mount 120 has one or more channels for receiving the one or more posts of the housing 102, one or more springs may be positioned around the posts or may abut other surfaces that are part of or are connected to the saw bar mount 120 and housing 102 to bias the saw bar mount 120 away from the housing 102 in the distal direction D.

Each post 128 may have a cap 132 associated with it. The cap 132 may be a cap, fastener, or other structure that can prevent the posts 128 from sliding too far in the distal direction D when the saw bar mount 120 is assembled with the housing 102, as shown in FIG. 1. The channels 118 in the housing 102 may be sized to allow the posts 128 to reciprocate linearly within the channels 118 while disallowing the caps 132 from entering the channels 118 because the caps 132 are larger than the channels 118.

The caps 132 may be, for example, threaded screws or bolts that can engage with an internally-threaded bore at the proximal end of each post 128. To assemble the saw bar mount 120 to the housing 102, the posts 128 without the caps 132 are inserted into the distal ends of the channels 118 of the housing 102 and advanced until the proximal ends of the posts 128 emerge from the proximal ends of the channels 118 of the housing 102. Then, the caps 132 may be attached to the proximal ends of the posts 128. Because the caps 132 cannot enter the channels 118, this sets the limit for distal positioning of the saw bar mount 120 with respect to the housing 102 and keeps the saw bar mount 120 assembled to the housing 102.

Figure 2:
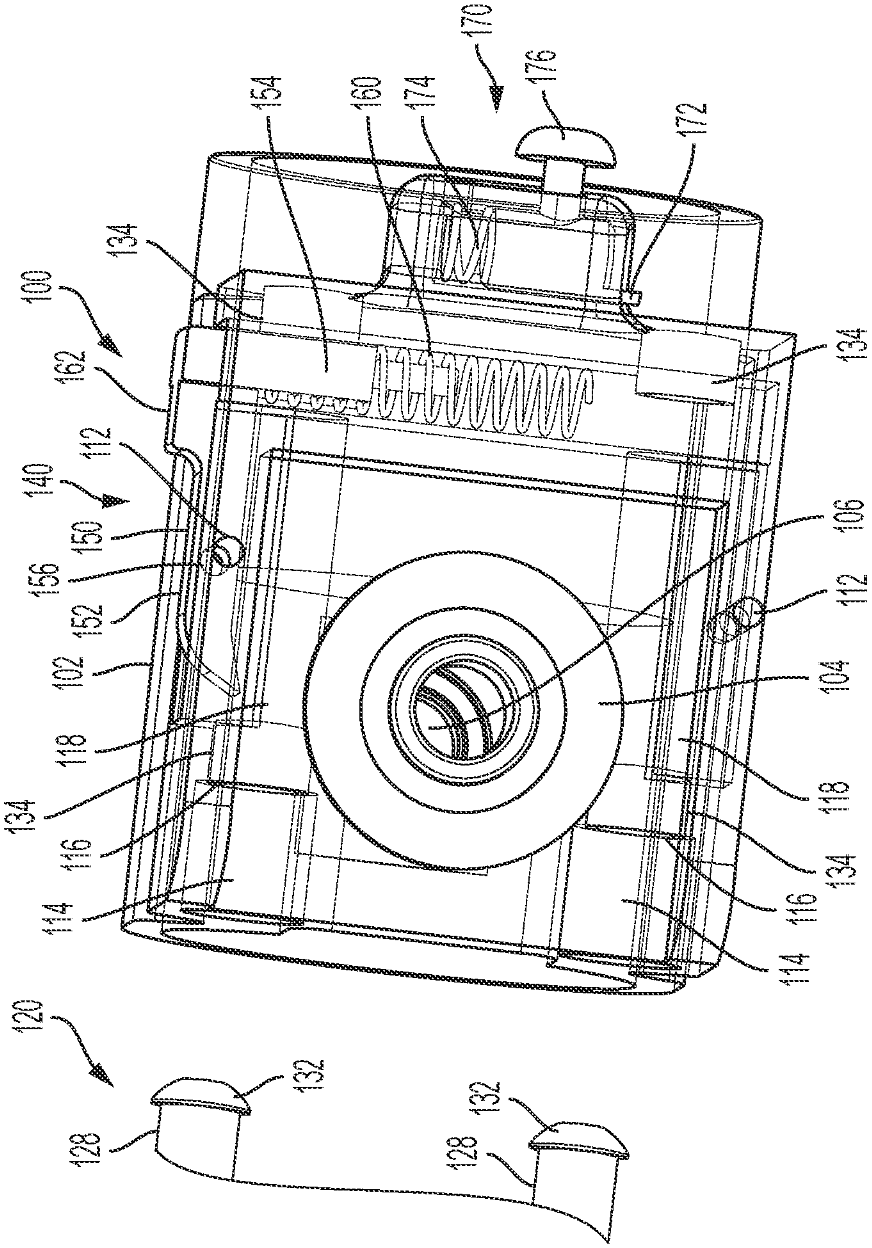
FIG. 2 shows the tensioning device of FIG. 1 with a saw bar mount separated from a housing of the tensioning device, before they are assembled together.
Figure 3:
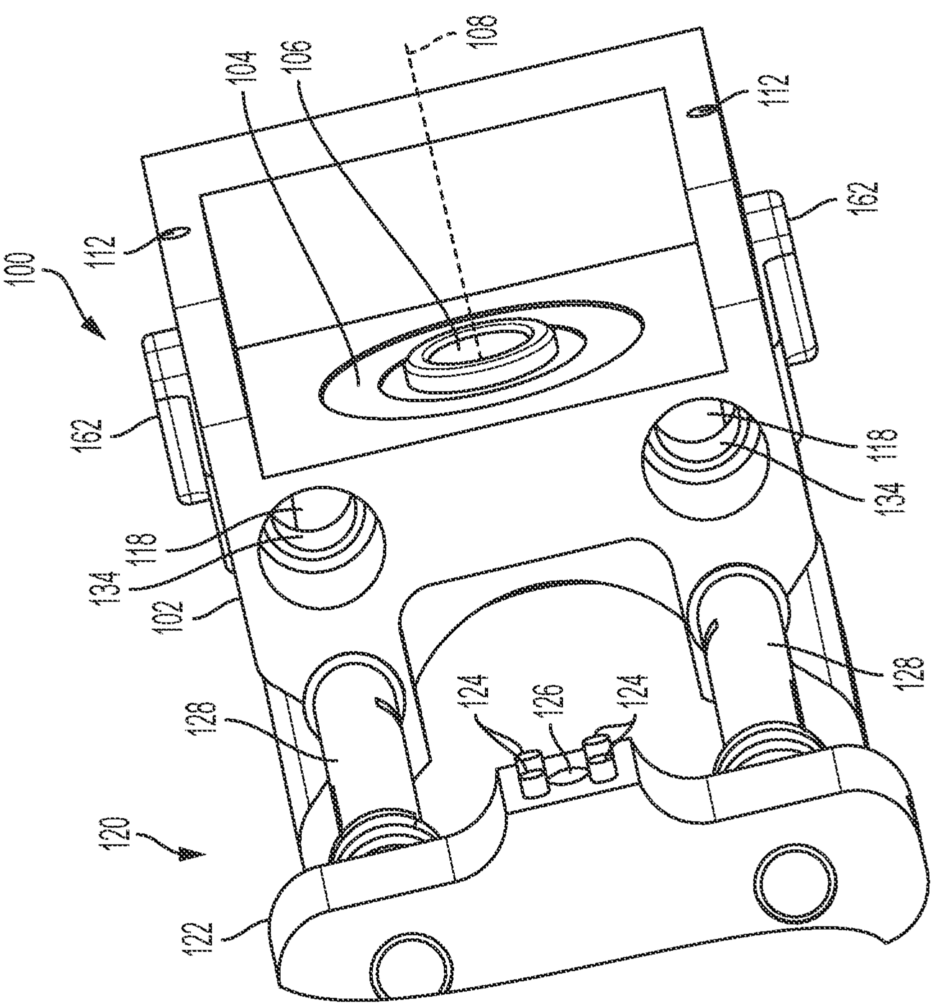
FIG. 3 shows a view from the distal side of the tensioning device of FIG. 1, prior to positioning the saw bar mount in the housing of the tensioning device.
Figure 4:
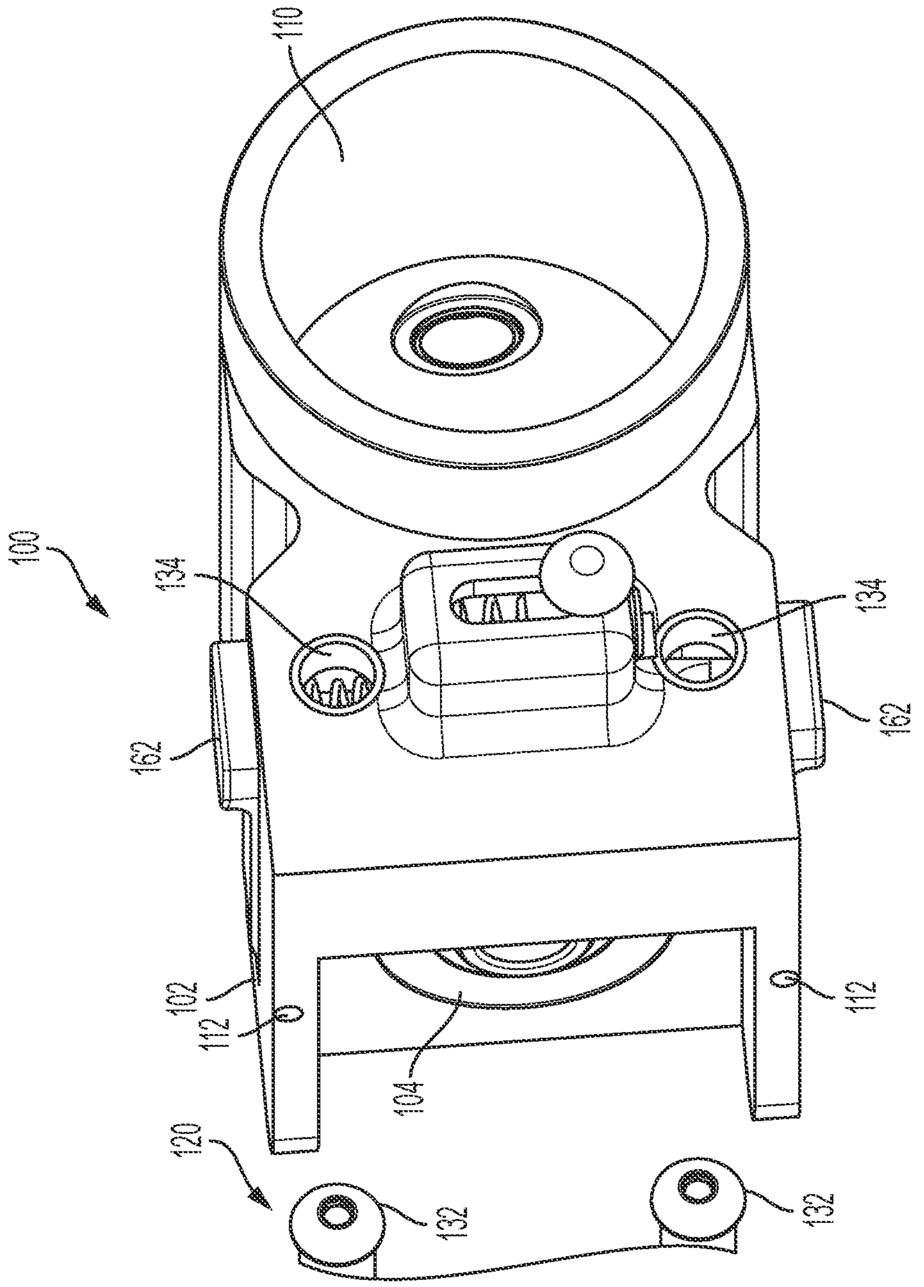
FIG. 4 shows a view from the proximal side of the tensioning device of FIG. 1, prior to positioning the saw bar mount in the housing of the tensioning device.
Figure 5:
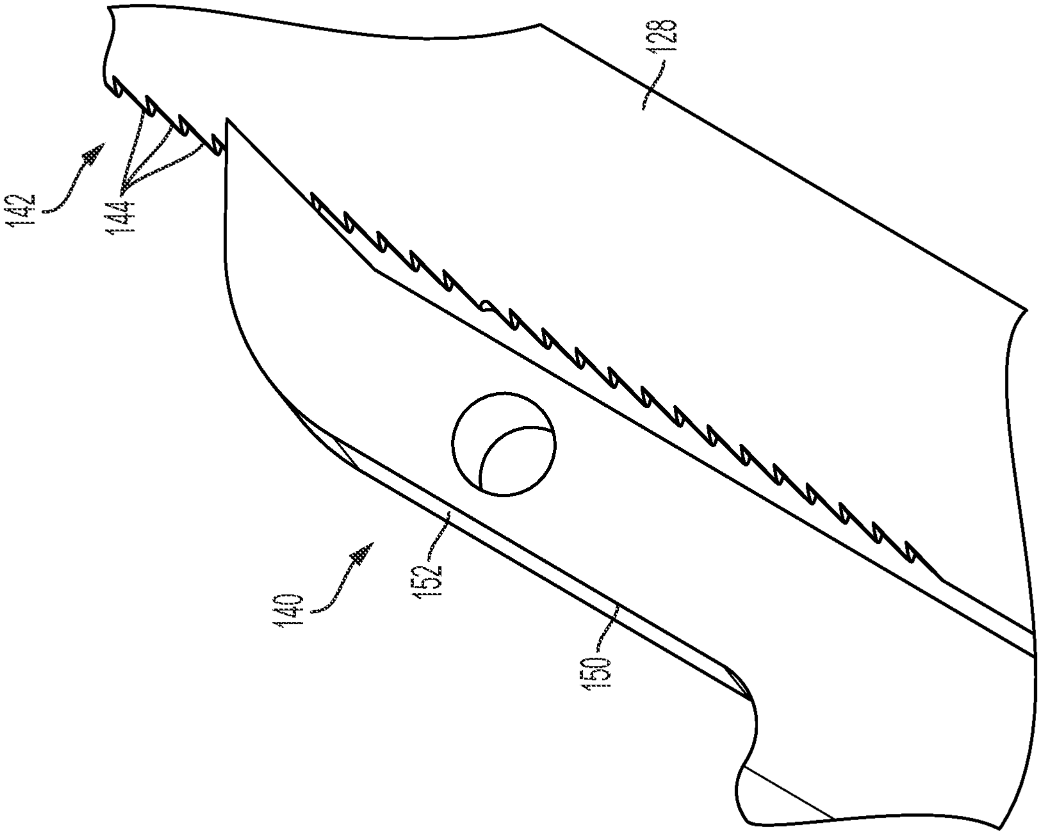
FIG. 5 shows a detailed view of a portion of a ratchet and pawl assembly.

In an alternative embodiment, the caps 132 may be made of a resilient material such as an elastomeric material and may be shaped to facilitate assembly. For example, the caps 132 may be shaped with a curved or sloped surface on one side (the proximal side) to facilitate compression of the caps 132 when the saw bar mount 120 is pressed into the distal ends of the channels 118 of the housing 102. FIG. 2 shows the housing 102 and the end of the saw bar mount 120 before they are assembled together. As the posts 128 of the saw bar mount 120 are directed into the distal ends of the channels 118 of the housing 102, the shape and resiliency of the caps 132 allows them to compress and fit within the channels 118. Once the posts 128 are fully through the channels 118, as shown in FIG. 1, the caps 132 exit the channels 118 and expand to their relaxed condition. At this point, due to the size and shape of the caps 132, the caps 132 cannot enter the channels 118 in the opposite direction. Because the caps 132 cannot enter the channels 118, this sets the limit for distal positioning of the saw bar mount 120 with respect to the housing 102 and keeps the saw bar mount 120 assembled to the housing 102.

The caps 132 may be removable to facilitate disassembly of the saw bar mount 120 from the housing 102. With the caps 132 removed, the saw bar mount 120 can be withdrawn in a distal direction D from the housing 102. This can facilitate cleaning of the housing 102 and saw bar mount 120.

As shown in FIGS. 1-4, one or more bushings 134 may be used to facilitate the posts 128 sliding within the channels 118. The bushings 134 may in some embodiments have a narrower internal diameter than the channels 118. The bushings 134 may be made of, or may have an internal surface that is made of or coated with, a material that reduces friction and facilitates sliding. The bushings 134 may be, for example, press fit into the housing 102, or assembled in another manner.

The housing 102 may have one or more areas for attachment to and/or accommodation of a drive cog 72 and/or drive cog assembly 70 of the chain saw as well as one or more areas for attachment to and/or accommodation of a driving mechanism for the chain saw. In other words, the housing 102 is adapted to be coupled to a drive cog 72 of a chain saw. For example, the housing 102 may have a drive cog mount 104 where a drive cog assembly 70 of the chain saw is to be located. The housing 102 may further have a drive mechanism area 110 through which a portion of the drive mechanism may be housed between a motor and the drive cog. A driving rotor may extend through a hole 106 in the drive cog mount 104 and may connect to the drive cog 72 or drive cog assembly 70. For example, the driving rotor may engage with a driving recess of the drive cog assembly 70. The driving rotor, rotated by the motor, transfers rotary motion from the motor to the drive cog assembly 70 to rotate the drive cog 72 about a drive cog axis 108.

The tensioning device 100 further comprises a ratchet and pawl assembly 140 for allowing the saw bar mount 120 to be moved in the distal direction D and for stopping movement of the saw bar mount 120 in the proximal direction P. The ratchet and pawl assembly 140 thus allows movement of the saw bar mount 120 in only one direction. The ratchet and pawl assembly 140 comprises one or more ratchets 142 that include a series of teeth 144, shown in detail in FIG. 5. In the illustrated embodiment, the ratchets 142 are on the posts 128. The ratchet and pawl assembly 140 also comprises one or more pawls 150 that can engage the teeth 144 in a one-way manner to allow the teeth 144 to move with respect to the pawl 150 in one direction but not the other. In this example, the teeth 144 have a shape such that when the saw bar mount 120 moves in the distal direction D the pawl 150 slides over the teeth 144, and when a force is applied to move the saw bar mount 120 in the proximal direction P the pawl 150 engages the teeth 144 to prevent movement of the saw bar mount 120 in the proximal direction P.

In the illustrated embodiment, the pawls 150 are generally L-shaped components, with a first arm 152 that engages with the teeth 144 and a second arm 154. The pawls 150 are pivotable about a pivot axis which may be accomplished, for example, by a pin (not shown) that extends through a hole 156 in the pawl 150 or a pin (not shown) that is integral with the pawl 150 at the location of the hole 156. The pin may be mounted to or in the housing 102 to allow the pawl 150 to pivot with respect to the housing 102. For example, the housing 102 may have one or more holes 112 for accommodating the pins of the pawls 150 to allow the pawls 150 to pivot about the axes of the pins.

At the ends of their second arms 154, the pawls 150 are biased by a spring 160. The spring 160 biases each pawl 150 such that it pivots about the pin axis and the tips of the first arms 152 are pressed toward the teeth 144. The spring 160 is designed such that when the saw bar mount 120 moves in the distal direction D, the spring 160 can compress in an amount sufficient to allow the pawl(s) 150 to slide over the teeth 144, and when a proximally-directed force is applied to the saw bar mount 120, the spring 160 provides sufficient force to the pawl(s) 150 for the tip(s) of the first arm(s) 152 of the pawl(s) 150 to engage the teeth 144 to prevent movement of the saw bar mount 120 in the proximal direction P.

FIG. 1 shows the arrangement of the pawls 150, while FIG. 2 shows one pawl 150 removed for clarity. In this example, the spring 160 is between the second arms 154 of the two pawls 150 such that one spring 160 is used for both pawls 150. The spring 160 operates on both pawls 150 at the same time, forcing the tips of each first arm 152 toward its respective teeth 144. The spring 160 maintains a balanced and equal inward pressure biasing the tips of the first arms 152 of the two pawls 150 toward their respective teeth 144. The spring 160 allows the tips of the first arms 152 to ride over the teeth 144 when the saw bar mount 120 is moved in the distal direction D but provides sufficient force to the pawls 150 to engage the teeth 144 to prevent movement of the saw bar mount 120 in the proximal direction P. In other embodiments, a separate spring can be used for each pawl 150.

The ratchet and pawl assembly 140 may further have one or more actuators 162 for allowing temporary disengagement of the pawl(s) 150 from the teeth 144. For example, the ratchet and pawl assembly 140 has an actuator 162 in the form of a button on each pawl 150. The buttons 162 extend beyond the housing 102 to be accessed by the user. The user can press the buttons 162 toward the housing to pivot each pawl 150 about its pin axis to disengage the pawls 150 from the teeth 144.

Other mechanisms may be used for allowing the saw bar mount 120 to be moved in the distal direction D and for preventing movement of the saw bar mount 120 in the proximal direction P. For example, the teeth 144 need not be on the posts 128 but may be on another component of the saw bar mount 120. The pawls 150 can take other forms for engaging the teeth 144. In some examples, like the illustrated example, the ratchet(s) and teeth are a component of or connected to the saw bar mount 120, while the pawl(s) is a component of or connected to the housing 102. In other examples, the pawl(s) may be a component of or connected to the saw bar mount 120, while the ratchet(s) and teeth may be a component of or connected to the housing 102.

Figure 6:
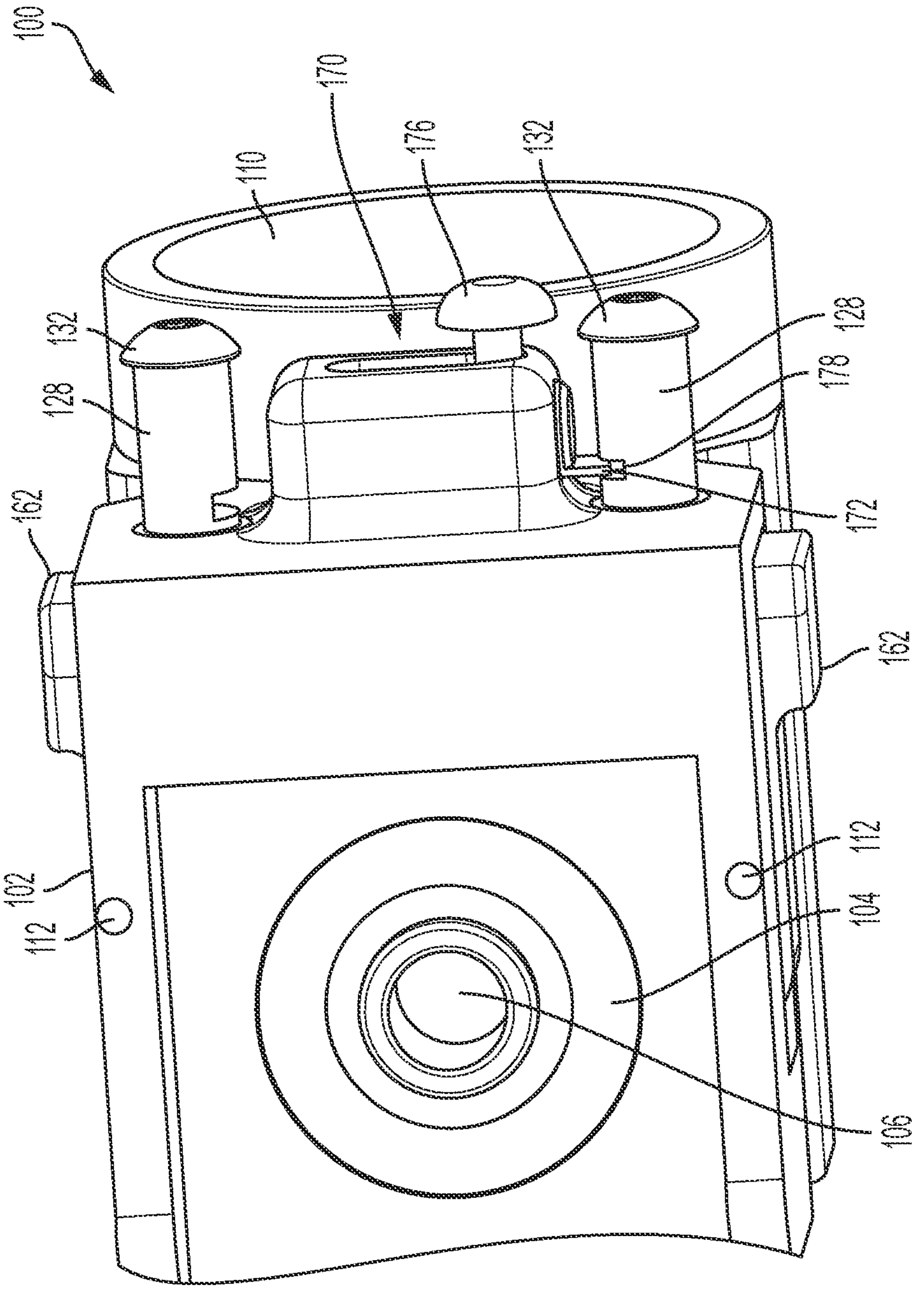
FIG. 6 shows a view of the top and distal end of the tensioning device of FIG. 1, after to positioning the saw bar mount in the housing of the tensioning device.
Figure 7:
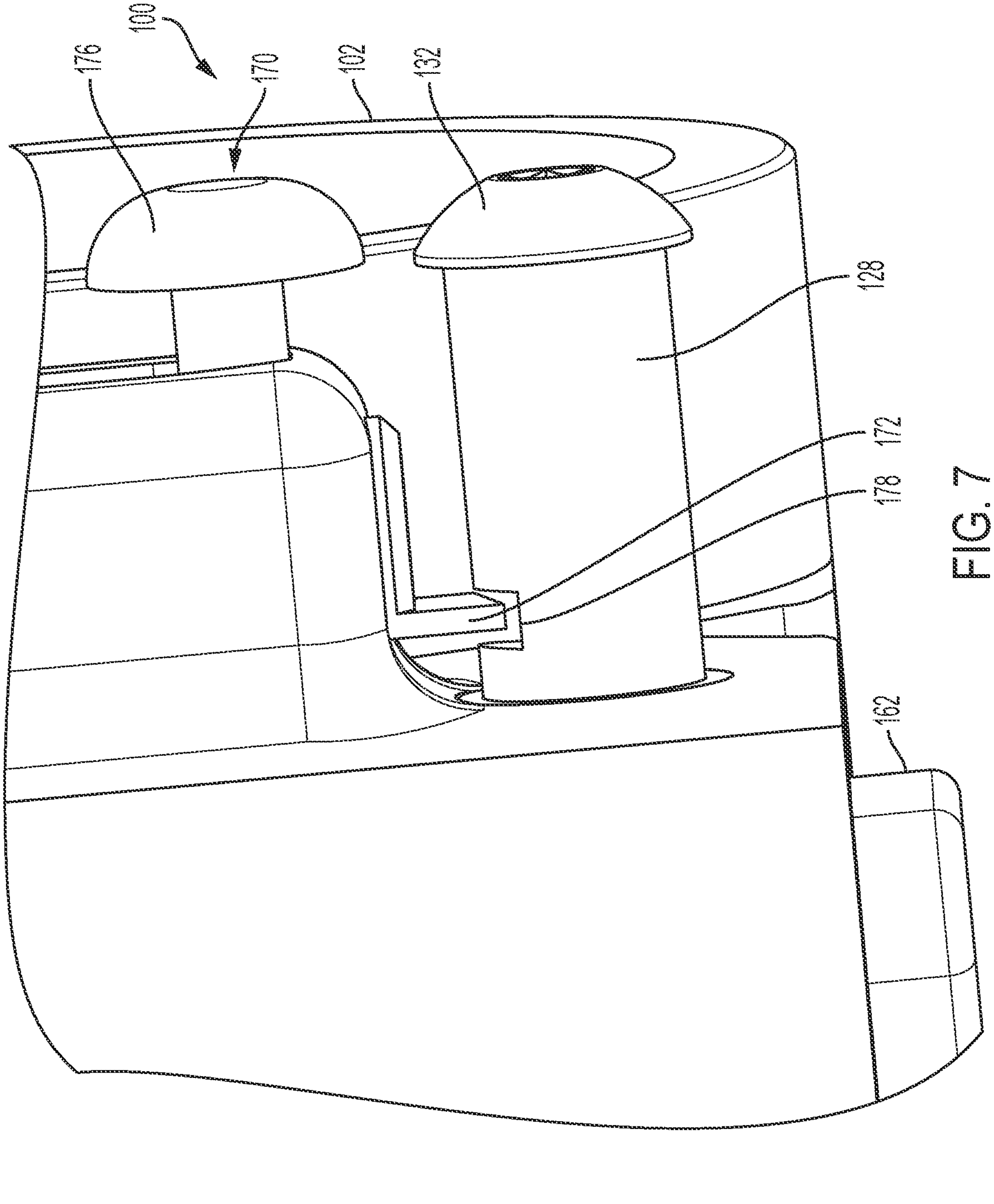
FIG. 7 shows a detailed view of a lock of the tensioning device of FIG. 1.
Figure 8:
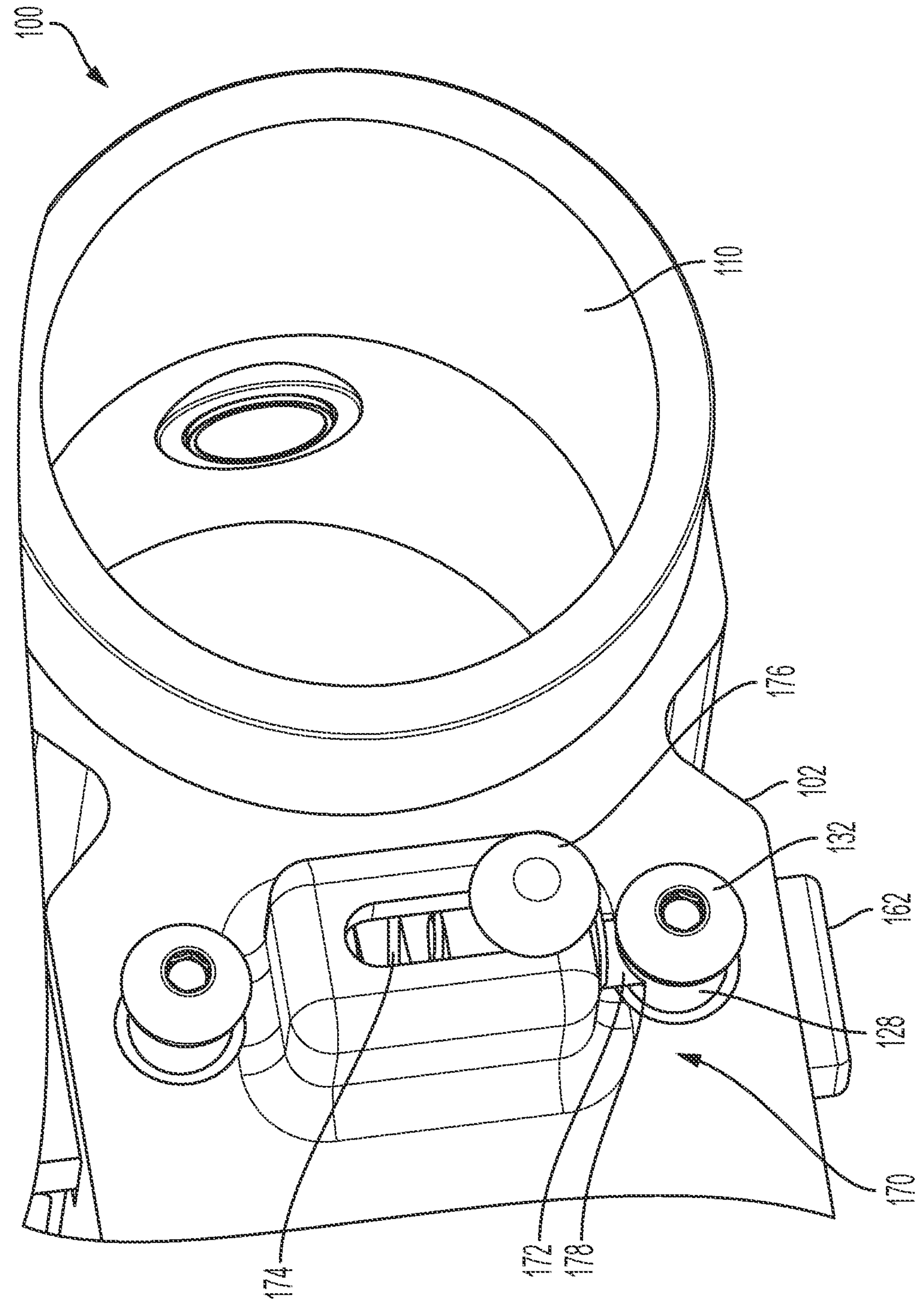

As can be seen in FIGS. 6-8, the tensioning device 100 further comprises a lock 170. The lock 170 includes a bolt 172 that is biased by a spring 174 toward a locked position. In the locked position, the bolt 172 engages with a post 128 to lock the post 128 from moving. For example, FIGS. 6-8 show the bolt 172 engaged with a groove 178 in one of the posts 128. The lock 170 is adapted to hold the saw bar mount 120 in a proximal position against a biasing force of the spring(s) 130. An actuator 176 can be used to unlock the bolt 172 to release the post 128.

Once the lock 170 is moved to the unlocked position, the springs 130 force the saw bar mount 120 in the distal direction D, causing the groove 178 to move away from the position of the bolt 172. The lock 170 may have a feature to keep it in the unlocked position, i.e., to keep the bolt 172 away from the post 128, so that the bolt 172 does not drag against the post 128 in operation. Alternatively, the bolt 172 may be left to slide against the post(s) 128, since the groove 178 is out of the way. The posts 128 may be made of a material to facilitate this, e.g., stainless steel.

The following is an example of an assembly and operation of the tensioning device 100. Starting from the condition shown in FIG. 2, the saw bar mount 120 is assembled to the housing 102 by advancing the posts 128 into the distal ends of the channels 118 and through the channels 118. To allow the saw bar mount 120 to be moved proximally, the actuators 162 are pressed toward the housing 102 to pivot each pawl 150 about its pin axis to temporarily move each pawl 150 out of the way of its respective teeth 144. Once the distal ends of the posts 128 exit the channels 118, the saw bar mount 120 can remain assembled to the housing 102 by the caps 132 as described above. The actuators 162 may then be released.

The saw bar 20, drive cog 72 or drive cog assembly 70, and chain may be attached to the tensioning device 100 as a single unit or cartridge 10 (as shown in FIG. 9A). To mount the cartridge 10 to the tensioning device 100, starting from the position shown in FIG. 1, the user presses the saw bar mount 120 in the proximal direction P relative to the housing 102. As with assembly of the saw bar mount 120 to the housing 102, to allow the saw bar mount 120 to be moved proximally, the actuators 162 are pressed to temporarily move each pawl 150 away from its respective teeth 144. As discussed above, one or more springs 130 are used to bias the saw bar mount 120 away from the housing 102 in the distal direction D. Thus, moving the saw bar mount 120 in the proximal direction P relative to the housing 102 is against the biasing force (also called the restoring force) of the spring(s) 130 and increases the restoring force of the spring(s) 130. When the posts 128 have been pushed proximal enough to reach the locking position, as shown in FIGS. 6-8, the lock 170 is actuated or self-actuates to lock the post(s) 128 and thereby the saw bar mount 120 in the locked position. In the illustrated embodiment, when the posts 128 have been pushed proximal enough such that the groove 178 is adjacent the bolt 172, the spring 174 forces the bolt 172 into the groove 178 to lock the saw bar mount 120 in the locked position. In this locked position, movement of the saw bar mount 120 relative to the housing 102 is prevented by the lock 170. The actuators 162 may then be released.

At this point, the cartridge 10 (including the saw bar 20, drive cog 72 or drive cog assembly 70, and chain) can be mounted on the tensioning device 100. The proximal end of the chain saw bar 20 can be mounted to the saw bar holder 122 (e.g., by use of pins 124, hole 126, and/or one or more suitable fasteners), and the drive cog 72 or drive cog assembly 70 can be mounted on or at the drive cog mount 104. These parts may carry the chain of the chain saw at the time they are mounted to the saw bar holder 122 and drive cog mount 104. Alternatively, the chain saw bar 20 and drive cog 72 or drive cog assembly 70 can be mounted on or at the saw bar holder 122 and drive cog mount 104, respectively, prior to placing the chain on the saw bar 20 and drive cog 72. Then, with the chain saw bar 20 and drive cog 72 in their respective positions as held by the lock 170, the chain may be placed on the saw bar 20 and drive cog 72. In either case, the locking of the saw bar mount 120 facilitates easy loading of the cartridge and/or chain. In either case, the housing is coupled to the drive cog 72 of the chain saw, and the saw bar mount is coupled to the saw bar 20 of the chain saw.

In an alternative embodiment, the proximal end of the chain saw bar 20 can be mounted to the saw bar holder 122 and/or the drive cog 72 or drive cog assembly 70 can be mounted on or at the drive cog mount 104 prior to assembling the saw bar mount 120 to the housing 102, or prior to moving the saw bar mount 120 to the locked position. Then the saw bar mount 120 can be moved to the locked position, at which point the chain may be placed on the saw bar 20 and drive cog 72. In this alternative embodiment, as with the prior embodiment, the housing is coupled to the drive cog 72 of the chain saw, and the saw bar mount is coupled to the saw bar 20 of the chain saw.

With the chain saw bar and drive cog or drive cog assembly mounted on or at the saw bar holder 122 and drive cog mount 104, respectively, and with the chain around the chain saw bar and drive cog, the user then releases the lock 170. In the illustrated example, the user moves the actuator 176 against the force of the spring 174 to release the bolt 172 from the groove 178 in the post(s) 128. This releases the saw bar mount 120, whereby the springs 130 force the saw bar mount 120 in the distal direction D. This moves the saw bar in the distal direction D away from the drive cog axis 108 and serves to take up any slack in the chain of the chain saw and to tension the chain of the chain saw. The distal extent of movement is limited by the tension of the chain of the chain saw. The springs 130 are selected to provide the desired amount of tensioning. For example, the properties of the springs 130 (size, shape, geometry, material, spring constant, etc.) are selected to provide the desired amount of tension in the chain for a particular application.

As the chain saw is used, forces on the chain saw may be directed in the proximal direction P. However, the ratchet and pawl assembly 140 prevents proximal movement of the saw bar mount 120 by engagement of the pawls 150 with the teeth 144. This prevents the saw bar from moving toward the drive cog, which could cause a loosening of the chain and/or disengagement of the chain from the drive cog and/or saw bar.

During use, operating conditions may cause changes that result in a loosening of the chain. For example, the chain can become loosened due to various factors, such as wear on the links of the chain, wear on the bar, wear on the drive cog, stretching of the chain, vibrations, etc. The springs 130 continue to provide a distally-directed force on the saw bar mount 120. As the chain loosens, the springs 130 force the saw bar mount 120 distally, and the pawl(s) 150 ride over the teeth 144 to allow this distal movement of the saw bar mount 120. This keeps the chain properly engaged with the drive cog, keeps the chain properly engaged with the saw bar, and maintains the desired tension in the chain through use of the device. The pawl(s) 150 can engage different teeth 144 along the ratchet 142 to accommodate the new positions for saw bar mount 120 with respect to the drive cog axis 108.

Devices as disclosed herein are useful for putting a chain under a desired tension for initial use and/or for maintaining a desired tension in the chain during operation of the chain saw. Devices as disclosed herein are useful for keeping a chain engaged with a drive cog and saw bar. Devices as disclosed herein can achieve one or more advantages, such as: lower cost, easier use, less failure, more precise cuts, lower procedure time, lower recovery time, and/or better outcomes.

Persons of ordinary skill in the art will appreciate that the embodiments encompassed by the disclosure are not limited to the particular example embodiments described above. While illustrative embodiments have been shown and described, a wide range of modification, change, and substitution is contemplated in the foregoing disclosure. It is understood that such variations may be made to the foregoing without departing from the scope of the disclosure.

What is claimed is:

1. A method of assembling a chain saw cartridge to a tensioning device of a chain saw, the method comprising the steps of:

(i) prior to coupling the chain saw cartridge to the tensioning device, a user of the chain saw manually moving a saw bar mount of the tensioning device in a proximal direction to a cartridge loading position, whereby the user manually moving the saw bar mount in a proximal direction to the cartridge loading position increases a restoring force of at least one spring of the tensioning device;

(ii) while the saw bar mount is in the cartridge loading position, coupling the chain saw cartridge to the tensioning device, wherein the chain saw cartridge includes a saw bar, a drive cog, and a chain around the saw bar and the drive cog, wherein the step of coupling the chain saw cartridge to the tensioning device comprises coupling the saw bar of the chain saw cartridge to the saw bar mount of the tensioning device; and (iii) releasing the saw bar mount from the cartridge loading position, wherein the restoring force of the at least one spring is adapted to bias the saw bar mount in a distal direction, thereby tensioning the chain of the chain saw cartridge, and wherein the step of releasing the saw bar mount from the cartridge loading position is performed by the user by actuating linear movement of an actuator, which allows the restoring force of the at least one spring to bias the saw bar mount and the saw bar in the distal direction.

2. The method as recited in claim 1, further comprising using a lock to temporarily hold the saw bar mount in the cartridge loading position against the restoring force of the at least one spring.

3. The method as recited in claim 2, further comprising releasing the lock to perform the step of releasing the saw bar mount from the cartridge loading position.

4. The method as recited in claim 1, wherein during use of the chain saw the restoring force of the at least one spring provides a distally-directed force on the saw bar mount that keeps the chain of the chain saw cartridge engaged with the drive cog and with the saw bar and maintains tension in the chain.

5. The method as recited in claim 4, further comprising, during use of the chain saw, allowing the saw bar mount to be moved by the at least one spring in the distal direction and stopping movement of the saw bar mount in a proximal direction.

6. The method as recited in claim 5, wherein stopping movement of the saw bar mount in the proximal direction is accomplished by a ratchet and pawl assembly.

7. The method as recited in claim 1, wherein the saw bar mount comprises one or more pins and the saw bar comprises one or more holes or recesses for receiving the one or more pins of the saw bar mount; and wherein the step of coupling the chain saw cartridge to the tensioning device comprises coupling the saw bar of the chain saw cartridge to the saw bar mount of the tensioning device by fitting the one or more holes or recesses of the saw bar onto the one or more pins of the saw bar mount.

8. The method as recited in claim 7, wherein the saw bar mount comprises one or more pins and the saw bar comprises one or more holes or recesses for receiving the one or more pins of the saw bar mount; and wherein the step of coupling the chain saw cartridge to the tensioning device comprises coupling the saw bar of the chain saw cartridge to the saw bar mount of the tensioning device by fitting the one or more holes or recesses of the saw bar onto the one or more pins of the saw bar mount.

9. A method of assembling a chain saw cartridge to a tensioning device of a chain saw, the method comprising the steps of:

(i) prior to coupling the chain saw cartridge to the tensioning device, a user of the chain saw manually moving a saw bar mount of the tensioning device in a proximal direction with respect to a housing of the tensioning device to a cartridge loading position, wherein the saw bar mount comprises at least one post received within at least one channel of the housing, wherein the tensioning device comprises at least one spring located between the saw bar mount and the housing, whereby the user manually moving the saw bar mount in a proximal direction with respect to the housing to the cartridge loading position increases a restoring force of the least one spring of the tensioning device;

(ii) while the saw bar mount is in the cartridge loading position, coupling the chain saw cartridge to the tensioning device, wherein the chain saw cartridge includes a saw bar, a drive cog, and a chain around the saw bar and the drive cog, wherein the step of coupling the chain saw cartridge to the tensioning device comprises coupling the saw bar of the chain saw cartridge to the saw bar mount of the tensioning device; and (iii) releasing the saw bar mount from the cartridge loading position, wherein the restoring force of the at least one spring is adapted to bias the saw bar mount in a distal direction, thereby tensioning the chain of the chain saw cartridge, and wherein the step of releasing the saw bar mount from the cartridge loading position is performed by the user by actuating linear movement of an actuator, which allows the restoring force of the at least one spring to bias the saw bar mount and the saw bar in the distal direction.

10. The method as recited in claim 9, further comprising using a lock to temporarily hold the saw bar mount in the cartridge loading position against the restoring force of the at least one spring.

11. The method as recited in claim 10, further comprising releasing the lock to perform the step of releasing the saw bar mount from the cartridge loading position.

12. The method as recited in claim 9, wherein during use of the chain saw the restoring force of the at least one spring provides a distally-directed force on the saw bar mount that keeps the chain of the chain saw cartridge engaged with the drive cog and with the saw bar and maintains tension in the chain.

13. The method as recited in claim 12, further comprising, during use of the chain saw, allowing the saw bar mount to be moved by the at least one spring in the distal direction and stopping movement of the saw bar mount in a proximal direction.

14. The method as recited in claim 13, wherein stopping movement of the saw bar mount in the proximal direction is accomplished by a ratchet and pawl assembly.

15. The method as recited in claim 9, wherein the at least one spring of the tensioning device is sleeved around the at least one post of the saw mount.

* * * * *